3,396,533
SPEED BOOST CONTROL FOR AN ENGINE EXHAUST DRIVEN TURBOCHARGER

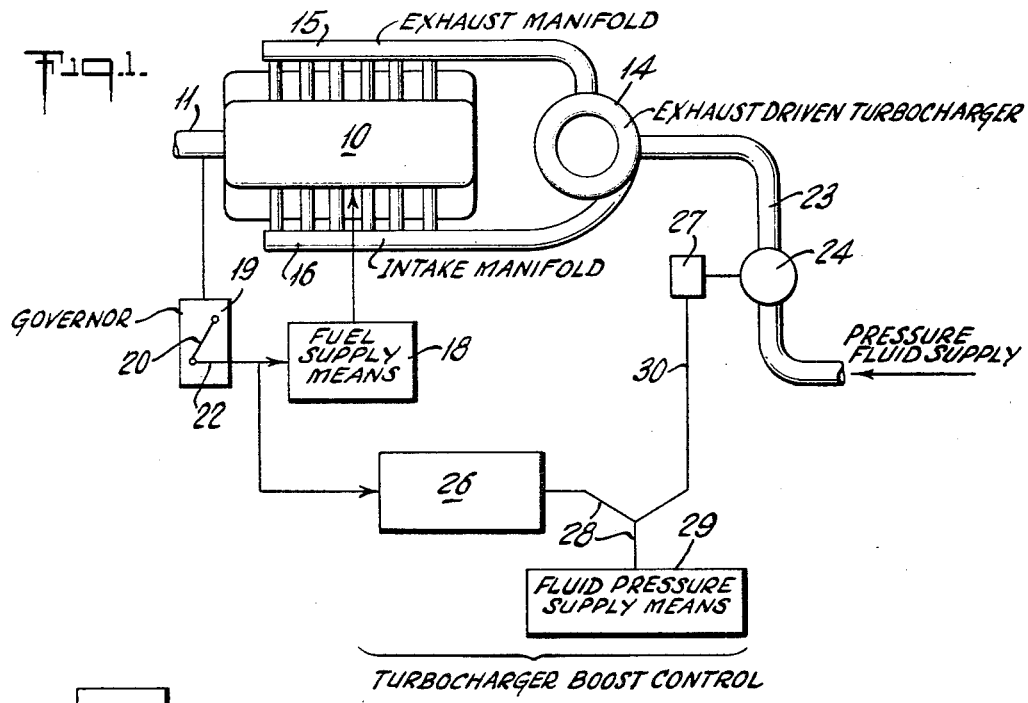
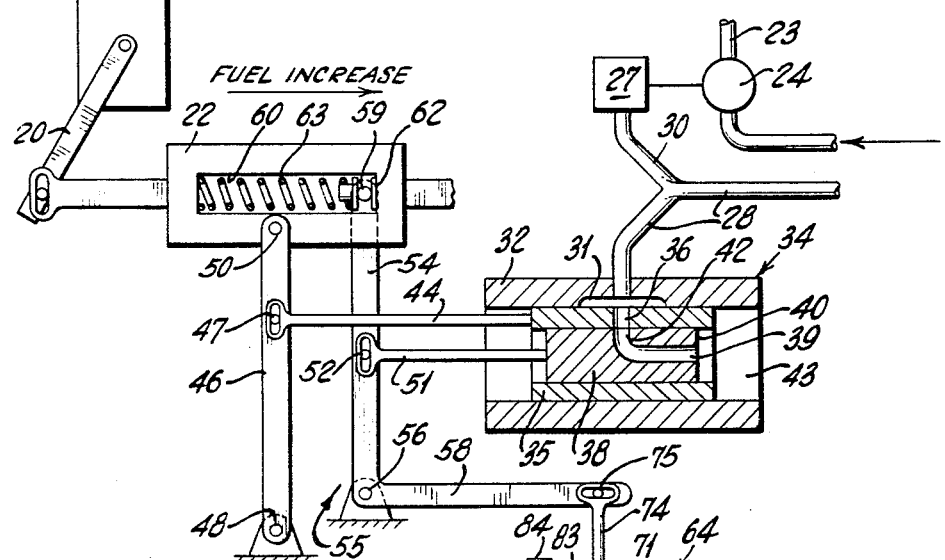

Walther C. Fischer, Janesville, Wis., assignor to Fairbanks Morse Inc., New York, N.Y., a corporation of Delaware
Filed Aug. 17, 1966, Ser. No. 573,009
6 Claims. (Cl. 60—13)

ABSTRACT OF THE DISCLOSURE

In an internal combustion engine including an engine driven fuel control governor and an exhaust driven turbocharger supplying scavenging and combustion air to the engine, the provision of a control system effective in response to rapid fuel increasing operation of the governor under conditions of engine starting and sudden or rapid increase in engine loading, to cause delivery of a pressure fluid (as compressed air) to the tubocharger for promoting rapid acceleration of the tubocharger to an operating speed assuring adequate air supply to the engine under said conditions.

---

This invention relates to supercharged internal combustion engines and more particularly to a supercharging control provision for engines having exhaust driven tubocharger means.

It is well known in connection with supercharged engines and more especially engines of the two cycle type wherein the exhaust driven tubocharger is the sole source of engine air supply, that such engines are subject to deficiencies in air supply at engine starting and under certain load increase conditions. In the engine starting phase, the exhaust is usually insufficient to produce tubocharger acceleration rapidly enough to supply the amount of air necessary for efficient engine operation in acceleration to the desired idling or other operating speed. When the engine is in operation, any sudden or rapid increase in engine loading normally results in a correspondingly rapid increase in fuel supply. However, under such loading conditions there is a material lag in tubocharger speed increase due in part to the lag in volume and temperature increase of the exhaust gas and also to the flywheel inertia effect of the tubocharger rotors. Marked deficiency of air supply under the above conditions and particularly as a result of rapid load increase, may well cause the engine to stall.

The aforementioned difficulties in a tubocharged engine have been overcome by including an auxiliary blower either separately driven or operated from the associated engine. But where it is desired to eliminate such auxiliary blower equipment and afford engine air supply solely through an exhaust driven turbocharger, an effective control provision for the turbocharger is required to assure turbocharger operation adequate to the needs of the associated engine under starting acceleration and sudden or rapid loading conditions. Accordingly, an object of this invention is to provide a relatively simple yet highly effective control arrangement operable automatically to promote more rapid turbocharger acceleration at engine starting and to boost turbocharger speed upon engine loading or load increase when suddenly or rapidly applied.

Another object is to provide effective control means responsive to operation of the engine fuel control governor, for controlling admission of pressure fluid to the tubocharger to promote rapid acceleration of the tubocharger to an operating speed assuring fully adequate air supply to the engine.

Another object is to provide control means as indicated, operable automatically to control the duration of pressure fluid admission to the turbocharger.

The foregoing and other objects and advantages of the present invention will appear readily from the following description of a preferred embodiment thereof, as exemplified in the accompanying drawing, wherein:

FIG. 1 is a schematic view of a turbocharged engine embodying the present invention, and FIG. 2 is a somewhat diagrammatic view of the turbocharger speed boost control arrangement according to the invention.

Referring first to FIG. 1, the engine indicated at 10 which may be a two cycle engine operable on oil fuel as a diesel, or on gaseous fuel or both, includes a power take-off shaft 11 and an exhaust driven turbocharger 14. Engine exhaust manifold 15 leads to the turbine drive section of the turbocharger while the engine air intake manifold 16 is connected to the blower or compressor section of the turbocharger. The engine fuel supply means indicated at 18 (which may be a fuel injection pump or pumps or a gas throttle valve assembly, depending on the type of fuel used), is under fuel quantity supply control of an engine fuel control governor 19, the latter having its control arm 20 operatively connected by link 22 to fuel supply means 18. Turbocharger speed boost energy is derived in the present example, from a suitable source (not shown) of pressure fluid which is delivered by line 23 to one or more discharge nozzles (not shown) located in either the turbine or the compressor section of the turbocharger, in fluid drive relation to the rotor therein. The pressure fluid preferably is high pressure air, as of the order of 150 to 350 p.s.i., and may be taken from the engine air starting source. Delivery line 23 includes a control valve 24 the opening and closing of which is determined by a turbocharger boost control in operative arrangement between the valve and the governor link 22. In the present example, such boost control includes a control device indicated at 26, a fluid pressure operated valve actuator 27 for valve 24, a supply line 28 leading from a suitable source of fluid pressure indicated at 29 to the control 26, and branch 30 from line 28 to the actuator 27. The boost control is diagrammatically shown in FIG. 2 to which reference now will be made.

Provided in operative connection to valve 24 in turbocharger pressure fluid line 23 is a valve actuator 27 of suitable fluid pressure operated type. In the present example, actuator 27 is adapted for opening valve 24 in response to fluid pressure, which may be oil pressure, delivered thereto over supply line 28 and branch line 30 from a suitable source 29 (FIG. 1) affording oil supply at a pressure of the order of 10 to 30 p.s.i. Such source may be the pressure lube oil provision in the associated engine. Oil supply line 28 is connected to input port 31 in casing barrel 32 of a by-pass spill valve 34 of differential type. Provided in barrel 32 is a tubular slide valve element 35 having a port 36 located to be in communication with input port 31 in all operative positions of the slide valve. For that purpose, the input port 31 is extended longitudinally of barrel 32 as shown, in extent sufficient to assure that port 36 will remain open to the input port in all operating positions of slide valve 35. Coaxial with slide valve 35 and carried therein is a second slide valve element 38, the two slide valves being capable of relative axial displacements, effected as will hereinafter appear. Formed in slide valve 38 is a passage 39 open at end 40 of the slide valve 38, the passage extending to a port 42 opening laterally of the slide valve in position for communication with port 36 when the two slide valves occupy the relative positions shown in FIG. 2. When so positioned, the oil in supply line 28 will discharge through the differential valve via ports 36 and 42 and passage 39, and the fluid pressure in supply line 28 and branch line 30 then is lower than that which is required to operate valve actuator 27 so as to open valve 24. Thus valve 24 is in closed position and will remain closed as long as the two slide valves are aligned one to the other as shown in FIG. 2. The oil spill from passage 39 discharges through the open end 43 of barrel 32, and may be collected in suitable manner not shown, for return to the oil pressure source.

In the present example of the invention, slide valve element 35 is connected by operating rod 44 to a lever 46 at point 47 thereof intermediate to the lever ends, the lever being mounted at one end on fixed pivot 48 and having its opposite end pivotally connected at 50 to the fuel supply control link 22 of the engine governor 19. Consequently slide valve 35 is displaced and positioned in direct accordance with the functioning of the engine fuel control governor. The operating provision for slide valve 38 differs in respects presently appearing, to afford differential actuation of the slide valves in response to governor operation.

As shown, slide valve 38 is connected by rod 51 to an intermediate point 52 on arm 54 of a bell-crank lever 55 which is supported on fixed pivot 56 at the juncture of lever arms 54 and 58. The free end of lever arm 54 extends adjacent the governor link 22, and is provided with a pin 59 entered in slot 60 of link 22 for engagement with an abutment element 62 at one end of the link slot. Carried in the slot is a compression spring 63 arranged to be effective between the link 22 and lever arm pin 59, to bias the pin 59 against abutment 62. Movement of link 22 in governor operation for increasing fuel supply to the engine is to the right as viewed in FIG. 2 and indicated by the arrow. Thus it will appear that slide valve 38 will be directly actuated through lever arm pin 59 and abutment 62 in link movement in the fuel decreasing direction, while slide valve movement in response to governor displacement of link 22 in the fuel increasing direction, may be retarded through the yieldable drive connection afforded by spring 63.

Associated with arm 58 of bell-crank lever 55 is a lever movement retarding means, here preferably in the form of a regulatable fluid dashpot 64. The dashpot casing 66 provides fluid chambers 67 and 68 separated by the intermediate wall 70, chamber 67 being completely filled with suitable fluid such as oil or the like, and chamber 68 filled with the same fluid to a suitable level as indicated at 71. Received through a central opening in wall 70 is the dashpot plunger 72 which is connected by rod 74 to the free end of lever arm 58, as at 75. In wall 70 is a port 76 having a ball check valve 78 arranged to permit unrestricted transfer of the fluid from chamber 68 to chamber 67 upon plunger displacement in the direction of chamber 68, the ball valve closing the port in reverse movement of the plunger. Wall 70 further has a fluid transfer control orifice 79 the transfer capacity of which may be determined through regulation of a cooperating orifice valve element 80. Valve 80 is carried by an operating rod 82 in threaded extension through rod support 83, and terminating externally of the dashpot casing in an operating handle 84. By turning handle 84 the valve 80 may be adjusted toward or away from orifice 79, thereby to set the effective orifice opening for determining in particular, the rate of fluid transfer from chamber 67 to chamber 68 consequent to force application on the plunger 72 tending to effect plunger displacement in the direction of chamber 67.

Turning to the operation of the control, the operating elements of the control occupy the relative positions shown in FIGS. 2 when the engine is in shut-down condition. Because there is then no fluid pressure in line 30, valve actuator 27 is in the non-operated condition where valve 24 is held closed. In the initial phase of engine starting, pressure fluid is supplied to the inlet side of valve 24 which is in closed condition thereby stopping the pressure fluid from flowing in line 23. Also, engine lube oil under pressure delivery to line 28 will flow in supply line 28 and branch line 30 and through the now fully open port 36 and passage 39 discharging through the open end 43 of barrel 32. In starting, the governor response for establishing fuel delivery to the engine in desired amount, effects rapid movement of the link 22 in the fuel increasing direction. The slide valve 35 in direct connection through lever 46 to the link 22 will be displaced proportionately to the right as viewed in FIG. 2. At such time, movement of the slide valve 38 in the same direction will be retarded due to the dash pot load imposed on its actuating lever 55 in opposition to spring 63, the latter yielding to permit lag in displacement of slide valve 38 relative to slide valve 35. The extent of lag is such that port 36 of slide valve 35 is then in closed position beyond the port 42 of slide valve 38, thereby interrupting oil pressure by-pass through the spill valve. Consequently, oil pressure will increase in line 28 and pass through branch 30 to actuator 27, operating the latter to open valve 24 for admission of pressure fluid to turbocharger 14. The pressure fluid thus admitted, aids in starting rotation of the turbocharger rotors from standstill and acceleration thereof toward the operating speed necessary for air supply in quantity and pressure required in engine operation at idling or low load speed.

In the course of pressure fluid delivery to the turbocharger through open valve 24 and line 23 as above described, spring 63 acting through lever 55 will force displacement of dashpot plunger 72 in direction of chamber 67 and at the same time advance slide valve 38 in the direction of the open end 43 of barrel 32. Such plunger displacement produces transfer of fluid from chamber 67 to chamber 68 through the control orifice 79, the latter as adjusted by the valve element 80, determining the rate of fluid transfer and, hence, the time duration of spring advance to close pin 59 against abutment 62 and thereby bring port 42 of slide valve 38 into register with port 36 of slide valve 35. Upon reestablishment of communication between the slide valve ports 36 and 42 in the manner indicated, oil pressure in lines 28 and 30 will diminish because of full discharge flow through the spill valve, thereby causing the actuator 27 to close valve 24 and thus shut off further pressure fluid delivery to the turbocharger. It will now appear from the foregoing, that the duration of pressure fluid admission to the tubocharger corresponds to the time-duration of dash pot controlled spring advance of the slide valve 38 to bring its port 42 into communication with port 36 of slide valve 35, and that the duration of pressure fluid supply to the turbocharger may be predetermined as desired, by setting of the dash pot orifice valve 80.

Under engine operating conditions, whenever a load is suddenly applied or engine loading is suddenly or rapidly increased, the governor 19 responds quickly by rapid displacement of link 22 in the fuel increasing direction for engine fueling to meet such loading. In either such case, slide valve 35 is advanced in direct proportion to displacement of link 22, while advance of slide valve 38 is delayed or retarded in the same manner as described hereinbefore for the engine starting condition. Consequently, the control will act to admit pressure fluid to the turbocharger for boosting its speed toward that necessary for air supply adequate to the increased fuel condition. Again, the duration of speed boost admission of pressure fluid to the turbocharger corresponds to the time period of spring return of lever pin 59 to link stop abutment 62, which time period is settable through the dash pot orifice valve 80. In a given installation, dash pot orifice valve 80 normally will be adjusted to determine the duration of pressure fluid delivery to the turbocharger as over a time period sufficient for exhaust energy build-up to a condition where the exhaust energy alone is adequate for operating the turbocharger to supply the air required under the increased loading.

In any steady-state condition of engine operation, the slide valves 35 and 38 will be in port registry to by-pass oil pressure from actuator 27, so that the turbocharger pressure fluid supply valve 24 then remains closed. Moreover, when engine loading is applied or increased relatively slowly, the correspondingly slow movement of governor link 22 in the direction of fuel increase may permit pin 59 to remain in contact against abutment 62 under the influence of the biasing force provided by spring 63. Where such is the case, the link spring 63 retains pin 59 against abutment 62, and hence both slide valves 35 and 38 will be advanced at the same rate, thereby retaining the valve ports 36 and 42 in communication to by-pass oil pressure form actuator 27.

In fuel decreasing governor displacement of link 22, as upon unloading of the engine or decrease in the applied load, the slide valves will be moved together in positive manner whether link movement is rapid or slow, thus maintaining their ports 36 and 42 in communication to by-pass oil pressure from actuator 27. Positive drive of the lever 55 through the abutment 62 against lever pin 59 in fuel decreasing movement of the link 22, as to attain the indicated conjoint reverse movement of the slide valves, is here permitted because the dash pot then offers no resistance to such reverse movement of the lever 55. In this condition, the dash pot plunger moves toward chamber 68, and the resultant transfer of fluid from that chamber to chamber 67 then takes place in free, unrestricted flow through port 76 and past the then fully open ball check valve 78.

Having now illustrated and described a presently preferred embodiment of the invention, it is to be understood that modifications may be made thereto without departing from the scope and principles of the invention as hereinafter claimed.

I claim:

1. In an internal combustion engine having an engine fuel control governor and an exhaust driven turbocharger affording the sole source of air supply to the engine, the combination therewith of means including a control element for supplying pressure fluid to the turbocharger to promote rapid acceleration of the turbocharger to an operating speed affording adequate air supply to the engine, a fluid pressure operated actuator for said control element, a fluid pressure supply line to said actuator, a differential spill valve connected to said supply line and having cooperating relatively movable valve members each having a port therein, said valve members when in relative positions having said ports in communication, by-passing fluid pressure form said actuator, and operating means between said governor and said valve members effective only in response to rapid fuel increasing operation of the governor consequent to conditions of engine starting and sudden or rapid increase in engine loading, to cause differential movement of the valve members such as to remove said ports from communication and thereby close the spill valve, said spill valve in closed condition causing actuator operation of said control element for supplying pressure fluid to the turbocharger.

2. In an internal combustion engine having an exhaust driven turbocharger, and including a regulatable fuel supply meas and an engine driven governor, an operating connection between the governor and fuel supply means for governor, regulation of the latter, means including a control element for supplying pressure fluid to the turbocharger to promote rapid acceleration of the turbocharger to an operating speed affording adequate air supply to the engine, a fluid pressure operated actuator for said control element, a fluid pressure supply line to said actuator, a differential spill valve connected to said supply line, said spill valve providing cooperable valve elements effective in one cooperating condition to by-pass fluid pressure from said actuator, and effective in a second cooperating condition to prevent fluid pressure by-pass and thereby cause actuator operation of said control element for pressure fluid supply to the turbocharger, a pivotally supported lever connected to each of said valve elements, one of the levers being connected to said operating connection for direct movement thereby, a second one of the levers having a yieldable connection with said operating connection, and movement retarding means in operative connection to said second one of the levers, effective in rapid fuel increasing governor operation of said operating connection, to retard movement of said second one of the levers, thereby to cause said valve elements to assume said second cooperating condition.

3. In an internal combustion engine according to claim 2, wherein the said movement retarding means comprises a fluid dashpot providing a plunger having relatively unrestricted movement in one direction and retarded movement in the opposite direction.

4. In an internal combustion engine having an exhaust driven turbocharger, a regulatable fuel supply means, an engine driven fuel control governor, and an operating link between the governor and fuel supply means, the combination therewith of means including a control valve for supplying pressure fluid to the turbocharger to promote rapid acceleration of the turbocharger to an operating speed affording adequate air supply to the engine, a fluid pressure operated actuator for said control valve, a fluid pressure supply line to said actuator, a differential spill valve connected to said supply line, said spill valve having a pair of cooperable valve elements effective in one cooperating condition to by-pass fluid pressure from said actuator, and effective in a second cooperating condition to prevent fluid pressure by-pass and thereby cause actuator operation to open said control valve for pressure fluid supply to the turbocharger, a pivotally supported lever connected to each of said valve elements, one of the levers being connected to said operating link for direct movement therewith, an abutment on said operating link, the other of the levers having an end portion engageable with said abutment, yieldable means carried by said operating link biasing said lever end portion against said abutment, and adjustable movement retarding means effective on said other of the levers in opposition to said yieldable means, and operable to retard movement of said other lever under the bias of said yieldable means upon displacement of said operating link in response to rapid fuel increasing operation of the governor, thereby to cause said valve elements to assume said second cooperating condition, said retarding means further cooperating with said yieldable means following said displacement of the operating link, to cause restoration of the valve elements to said one cooperating condition.

5. In an internal combustion engine according to claim 4 wherein the said adjustable movement retarding means is a fluid dashpot having a fluid transfer orifice adjustable to determine the rate of restoration of the valve elements to the said one cooperating condition.

6. In an internal combustion engine having a fuel control governor and an exhaust driven turbocharger affording the sole source of air supply to the engine, the combination therewith of means including a control valve for supplying pressure fluid to the turbocharger to promote acceleration of the turbocharger to an operating speed affording adequate air supply to the engine, an actuator for said control valve normally retaining the valve closed, and governor operated means including a pair of differentially movable elements in control of said actuator, effective in an initial relative position of the elements to prevent operation of the actuator to open said control valve, said governor operated means in response to rapid fuel increasing operation of the governor consequent to engine starting and sudden or rapid increase in engine loading, responding by differetial movement of said elements from said initial relative position to cause operation of said actuator to open said control valve for pressure fluid supply to the turbocharger, and said governor operated means in response to both fuel decreasing operation and relatively slow fuel increasing operation of the governor, responding without differential movement of said elements from said initial relative position.

References Cited

UNITED STATES PATENTS

| | | | |
|---|---|---|---|
| 2,608,051 | 8/1952 | Nettel | 60—13 |
| 2,710,521 | 6/1955 | Nettel | 60—13 |
| 3,173,242 | 3/1965 | Erickson | 60—13 |

FOREIGN PATENTS

| | | |
|---|---|---|
| 288,217 | 6/1928 | Great Britain. |
| 620,376 | 3/1949 | Great Britain. |

MARTIN P. SCHWADRON, *Primary Examiner.*

DOUGLAS HART, *Assistant Examiner.*